United States Patent [19]

Faris

[11] 3,852,982

[45] Dec. 10, 1974

[54] RESILIENT RING FASTENER

[75] Inventor: Francis D. Faris, Bonita, Calif.

[73] Assignee: Twisty, Inc., National City, Calif.

[22] Filed: Dec. 4, 1972

[21] Appl. No.: 311,662

[52] U.S. Cl. .................................... 70/457, 70/458
[51] Int. Cl. ............................................ A47g 29/10
[58] Field of Search.......... 70/456 R, 457, 458, 459; 24/123 A, 123 R, 123 BC, 123 E, 123 G, 3 K

[56] References Cited
UNITED STATES PATENTS

| 66,244 | 7/1867 | Moulton | 24/123 E |
| 561,855 | 6/1896 | Baptist | 24/123 A |
| 1,435,347 | 11/1922 | Taylor | 24/123 A |
| 2,574,579 | 11/1951 | McCoy | 24/123 A |
| 2,771,768 | 11/1956 | Tudor | 70/457 |
| 3,237,977 | 3/1966 | Batchelder | 24/123 A |

FOREIGN PATENTS OR APPLICATIONS

| 37,657 | 12/1986 | Germany | 24/123 A |

Primary Examiner—Robert L. Wolfe
Attorney, Agent, or Firm—Brown and Martin

[57] ABSTRACT

A fastener for retaining the ends of a flexible ring including a male fastener element which is received through an entrance opening and slot and retained against a seat in a female fastener element. The resiliency and flexibility of the cable ring are utilized to retain the fastener element in position. The overall diameter of the fastener elements is not substantially greater than that of the resilient cable, therefore keys or other items secured on the ring may be passed over the fastener element in order that a selected key may be removed without the necessity of removing any other key. The entrance slot for the shank portion of the male element is oriented radially outwardly from the finished ring configuration to maximize the locked security of the fastener elements and facilitate connection and removal of the fastener element as desired.

7 Claims, 5 Drawing Figures

PATENTED DEC 10 1974 3,852,982

RESILIENT RING FASTENER

BACKGROUND OF THE INVENTION

A wide variety of key rings and other key retainers have been designed with the intention that a number of keys be retained and be readily available for use. However, prior art key rings and retainers have been deficient in several respects.

One type of key ring involves the use of a resilient U-shaped element on which the keys are received and a locking member which is held in place by the spring bias of the U-shaped element. In this type of key ring it may be necessary to remove all of the keys from the ring to select a particular key. The ring tends to be short lived in that the resiliency of the ring receiving portion eventually deteriorates to the point where the latching action is destroyed. Further, such key rings do not allow the keys to lie flat since the key retaining portion is not flexible. Also, with this type of key ring the latching element tends to catch on articles of clothing and other objects and thereby inadvertently become opened and allow a separation of the keys with the attendant possibility of loss.

Another type of key ring has been marketed and is described in the Tudor U.S. Pat. No. 2,771,768. In this type of key ring a resilient cable is utilized whereby the torsional flexibility of the cable retains two fastener elements in locked relation. This type of ring makes it possible to remove a selected key, without the necessity of removing any other key, and permits the keys to lie flat as a result of the bending flexibility of the cable. However, the requirement that the device be twisted into a figure eight configuration in order for the elements to be latched or unlatched is difficult for some users to master, and creates the potential for inadvertent openings when asymetrical pressure is placed on the ring by, for example, other articles in a user's pocket.

Thus, it is desirable to have a resilient key ring that permits the secured keys to lay flat in the pocket or purse, and permit the removal of a single selected key without the necessity of removing any other key, while at the same time being easy to use without special dexterity and without detailed instruction. Such a key ring is especially desirable if it is resistant to inadvertent opening.

SUMMARY OF THE INVENTION

An exemplary embodiment of the invention utilizes a resilient flexible member. Resilient stranded cable is especially suited to the to the purposes of the invention. The cable is flexible but resists bending to any orientation other than the originally laid orientation which for the purpose of the invention is cable laid in a straight line configuration. Attached to opposite ends of the length of cable are male and female fastener elements. The male fastener element includes an enlarged head portion secured to the main body portion by a shank. The female fastener element includes an entrance bore sized to permit insertion of the enlarged head portion of the male element. The entrance bore communicates with a head seat for receiving the head portion of the male element. A shank slot permits rotation of the male element about the seat portion to align the two fastener elements in the locked position. The male head portion is retained within the female portion and against the head seat by the resiliency of the cable. Cable resiliency and the tendency to return to the straight line orientation exerts a pulling force which is substantially aligned with the circumference of the circle formed by the cable in the locked position.

The head seat is spaced from the unattached end of the female fastener element by a distance equal to the shank of the male element so that the body portions of the male and female members are substantially in abutment in the locked relationship. The entrance bore is connected to the head seat by a head counter bore within the body of the female fastener element. This head counter bore is sized to be just greater in diameter than the head portion and spaces the seat from the entrance bore to provide good locked security.

Thus, there is providced a resilient ring and fastener suitable for carrying a plurality of keys, any one of which keys may be easily removed selectively without the removal of any other of the keys. The operation is sufficiently apparent from the structure itself, that no elaborate instruction in the use of the device is necessary, yet the fasteners produce a secure attachment that is not dislodged by rough handling.

It is therefore an object of the invention to provide a new and improved resilient ring fastener.

It is another object of the invention to provide a new and improved resilient ring fastener for carrying a plurality of keys.

It is another object of the invention to provide a new and improved resilient ring fastener that is relatively easy to manufacture.

It is another object of the invention to provide a new and improved resilient ring fastener that is low in cost.

It is another object of the invention to provide a new and improved resilient ring fastener that provides good locked security and protection against inadvertent opening.

It is another object of the invention to provide a new and improved resilient ring fastener that is easily operated without previous instruction.

It is another object of the invention to provide a new and improved resilient ring fastener that utilizes the inherent resiliency of stranded cable.

It is another object of the invention to provide a new and improved resilient ring fastener that is adaptable to a variety of ring materials and coverings.

Other objects and many attendant advantages of the invention will become more apparent upon a reading of the following detailed description together with the drawings in which like reference numerals refer to like parts throughout and in which.

Figure 1:
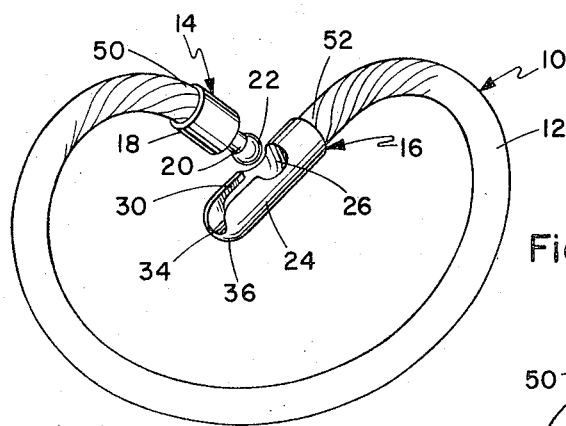
FIG. 1 is a perspective view of the ring fastener in position for connection of the ends.
Figure 2:
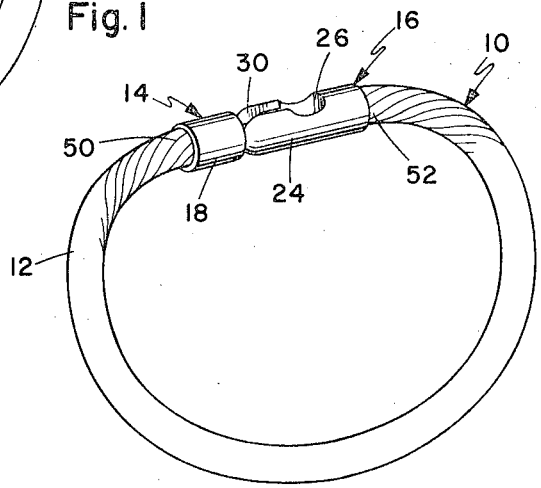
FIG. 2 is a perspective view of the ring fastener closed and locked.
Figure 5:
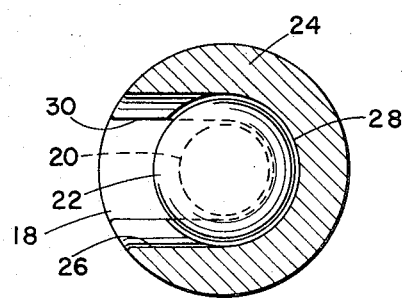
FIG. 5 is a sectional view taken on line 5—5 of FIG. 3.
Figure 3:
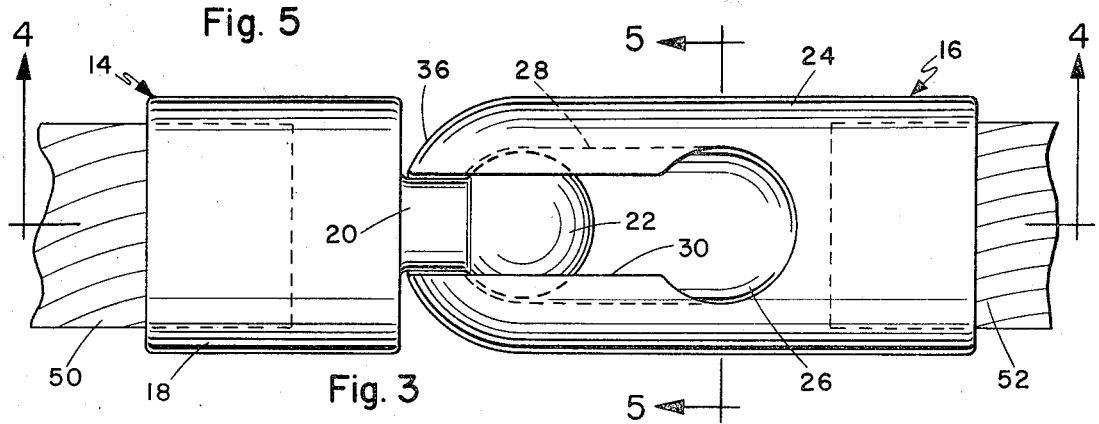
FIG. 3 is an enlarged top plan view of the connecting elements.

Referring now to the drawings there is illustrated a resilient ring fastener 10. The device includes a longitudinally resilient stranded cable 12 and male and female fastener elements 14 and 16.

The male fastener element 14 includes a body portion 18 secured to a first cable end 50 of cable 12 in alignment with the longitudinal axis of end 50. The body portion may be comprised of brass or similar material which may be swaged onto the cable end 50 or secured thereto by organic adhesive. A shank 20 extends from the body portion 18 in substantial alignment with the cable end 50 and mounts a spherical head portion 22.

Figure 4:
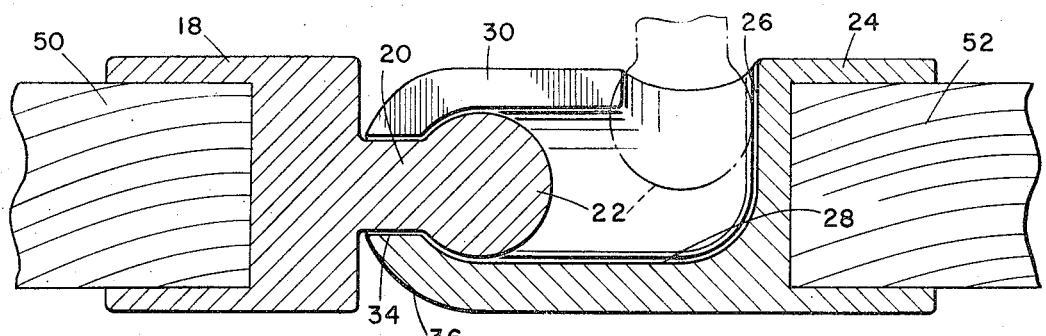
FIG. 4 is a sectional view taken on line 4—4 of FIG. 3.

The female fastener element 16 includes a body portion 24 received on and secured to end 52 of cable 12 in alignment with the longitudinal axis of end 52. The body portion is penetrated by a counter bore 28 which terminates in a partial spherical surface and head seat 32. Access to the head seat 32 and counter bore 28 is through an entrance bore 26. The entrance bore 26 and counter bore 28 are sized to accommodate the enlarged head portion 22 of the male element. Access for the shank 20 of the male element is provided in the form of a shank slot 30 which permits the enlarged head to be inserted into the entrance bore substantially in the orientation illustrated in FIGS. 1 and 4, and to be drawn along the counter bore 28 until the enlarged head contacts the head seat 32, whereupon the body of the male element may be rotated about the head seat, until the male element is in substantial alignment with the bore in the female element, and the body portions are substantially contacting. To provide clearance for the aforedescribed rotation the body portion 24 of the female element is rounded to have a rounded outer surface configuration 36. In the locked position the shank 20 is received in a shank bore 34 and this bore is substantially the same length as the shank to produce a body to body contact between the male and female elements.

OPERATION

In use, a plurality of keys may be installed onto the resilient cable member 12 by insertion over either end 50 or 52 or the cable 12. After the desired number of keys are inserted on the cable, the cable is bent to the circular configuration and a right angular relationship between the cable ends 50 and 52 established. The orientation is illustrated in FIG. 1 and permits the head 22 and shank 20 to be inserted into the entrance bore 26 of the female fastener element 16. After the initial insertion the enlarged head portion is drawn along the counter bore 28 until it contacts the head set 32 whereupon the cable end 50 and male element 14 are rotated so as to produce substantial alignment between the opposed cable ends 50 and 52. In this position the tendency of the cable 12 to assume the flat or straight line orientation securely holds the enlarged head 22 against the seat 32 and the spacing between the head seat and entrance bore ensures that the ring will not become disengaged inadvertently. The locking and holding action is not dependent of any resiliency of the fastener elements which may be substantially nonresilient material.

When it is desired to remove a particular key, the keys are rotated around the ring until the desired key is adjacent the fastener elements. The fastener elements are then bent to assume a 90 degree relation with respect to one another. The head element is moved along the female counter bore 28 until it is in alignment with the entrance bore 26 where it may be withdrawn. With the fastener disengaged, the desired key may be removed and the ends reattached in the previously described manner.

Having described my invention, I now claim:

1. A ring and fastener for releasably joining the ends of a resilient cable into a substantially circular continuous member comprising:
   a link of longitudinally resilient and flexible cable,
   a male fastener element having a body portion, a shank portion, and an enlarged head portion,
   a female fastener element having a body portion, a shank bore at one end of said body portion, and a head entrance bore in said body portion,
   said head entrance bore having a diameter in excess of the diameter of said enlarged head,
   a shank slot extending from said head entrance bore into said shaft bore,
   a head seat communicating with said head entrance bore and said shank slot,
   the first end of said cable having said male fastener element secured thereto,
   the second end of said cable having said female fastener element secured thereto,
   said male and said female fastener elements secure said ends of said cable into a substantially circular ring,
   the unsecured end of said female fastener element is rounded and forms an outer surface concentric with said head seat,
   the spacing between said head seat and said outer surface being substantially equal to the length of said shank of said male fastener element,
   said body portion of said male fastener is enlarged and extends radially outwardly from said shank portion,
   the distance from said head seat to the unsecured end of said female fastener element is substantially equal to the distance from the attachment point of said head to said enlarged body portion of said male fastener element,
   said enlarged body portion of said male fastener element being held substantially in contact with the unsecured end of said female fastener element,
   said cable exerting a resilient circumferential bias and holding said enlarged head portion of said male fastener element in contact with said head seat of said female fastener element.

2. The ring and fastener of claim 1, wherein:
   said male fastener shank portion is fixed in substantial alignment with the longitudinal axis of said first end of said cable;
   said female fastener element having a shaft bore extending from said head seat to the unsecured end of said element;
   said element being fixed on said second end of said cable with the longitudinal axis of said shaft bore in substantial alignment with the longitudinal axis of said cable.

3. The ring and fastener of claim 1, wherein the axis of said entrance bore is substantially at right angles to the axis of said shank bore.

4. The ring and fastener of claim 1, wherein said head is substantially spherical, and said head seat has a seating surface that corresponds to a portion of a sphere having substantially the same diameter as said head.

5. The ring and fastener of claim 1, wherein said male and female fastener elements are comprised of non-resilient material.

6. The ring and fastener of claim 2, wherein said entrance bore is connected to said shaft bore by a head counter bore having a diameter in excess of said head.

7. The ring and fastener of claim 1, wherein said shank slot is oriented in a direction radially outwardly of the circle formed by the cable when its ends are secured together by said fastener elements.

* * * * *